Oct. 4, 1960  L. D. SOUBIER  2,954,588
METHOD OF FORMING HOLLOW PLASTIC ARTICLES
Filed Sept. 21, 1953  3 Sheets-Sheet 1

INVENTOR.
LEONARD D. SOUBIER
BY
ATTYS.

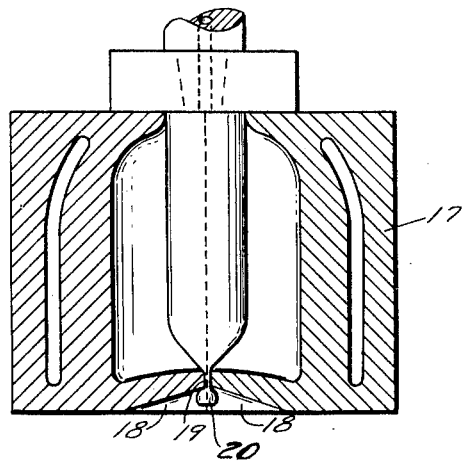
FIG. 7
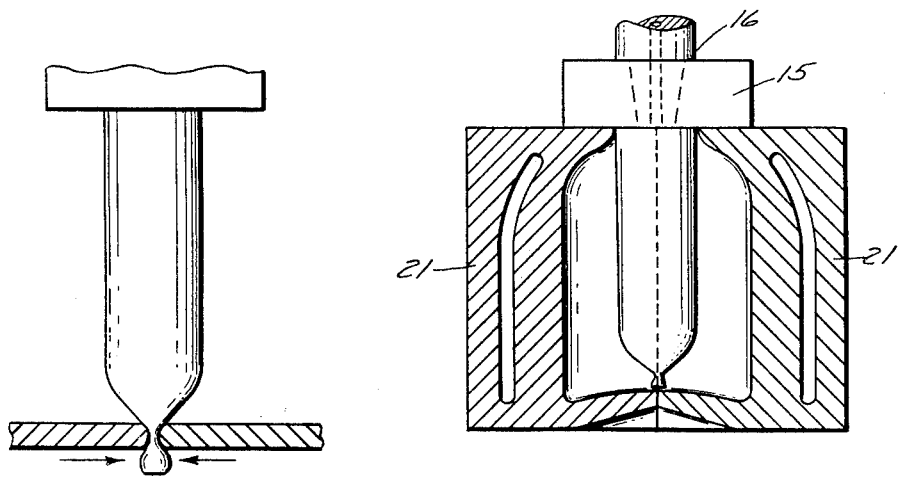
FIG. 8
FIG. 9

Oct. 4, 1960     L. D. SOUBIER     2,954,588
METHOD OF FORMING HOLLOW PLASTIC ARTICLES
Filed Sept. 21, 1953     3 Sheets-Sheet 3

INVENTOR.
LEONARD D. SOUBIER
BY
Rule and Hoge.
ATTYS.

United States Patent Office 2,954,588
Patented Oct. 4, 1960

2,954,588

METHOD OF FORMING HOLLOW PLASTIC ARTICLES

Leonard D. Soubier, Toledo, Ohio, assignor to Owens-Illinois Glass Company, a corporation of Ohio Filed Sept. 21, 1953, Ser. No. 381,311

2 Claims. (Cl. 18—55)

This invention relates to the manufacture of hollow articles and, more particularly, to the manufacture of hollow articles having a neck opening and made of organic plastic material.

In many of the methods heretofore suggested for the manufacture of hollow plastic articles, various trimming and boring operations have been required after forming in order to provide a finished article. These operations not only involve a waste of material but in addition have proved to be costly.

It is therefore an object of this invention to provide a method of forming hollow plastic articles wherein the article after forming requires little or no trimming.

Other objects of the invention will appear hereinafter.

Basically the method comprises extruding a quantity of plastic material from a parent mass into a tubular cavity, one end of the cavity being open, separating the quantity of plastic in the cavity from the parent mass, applying a force to the mass of plastic in the cavity to force a portion of the plastic out of the open end of the cavity into a neck mold positioned over the cavity, continuing the application of force to said tubular mass simultaneously with an axial movement of the neck mold away from the open end of the cavity, thereby removing the mass of plastic with the neck formed integral therewith from the cavity, and expanding the plastic to the walls of the mold by applying air or other fluid under pressure.

Referring to the accompanying drawings:

Figs. 1 to 7 are sectional elevational views of an apparatus for performing the steps of the method;

Figs. 8 and 9 are sectional elevational views of an apparatus for performing a modification of the method;

Figure 1:
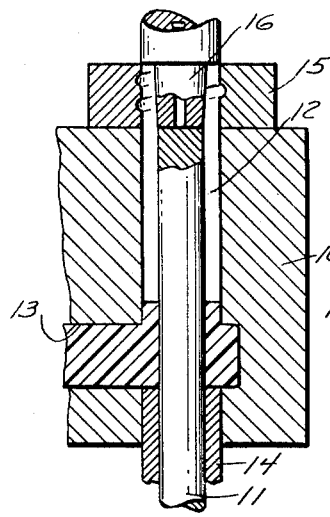

Referring to Figs. 1 to 6 the apparatus for performing the method includes a body 10 having a vertical cylindrical opening therethrough and a mandrel 11 positioned in said opening to form a tubular cavity 12. The tubular cavity 12 is in communication with the outlet of a plasticizer and extruder (not shown) through communicating channel 13. A sleeve 14 surrounds the mandrel 11 and reciprocates vertically in the cavity 12 from a position below the communicating channel 13 to a position in flush relationship with the open end of the tubular cavity 12, thereby severing the tubular blanks, formed in the cavity 12, from the supply body at the outlet orifice of the channel 13.

A partible neck mold 15 and hollow core 16 are mounted for relative axial movement into and out of contact with the tubular cavity 12.

A mold 17 (Fig. 7) is provided in which a tubular mass of plastic is expanded as presently described. The bottom of the mold sections are beveled at 18 and slightly spaced apart at 19 when the mold is closed in order to seal the plastic tubing.

Figure 2:
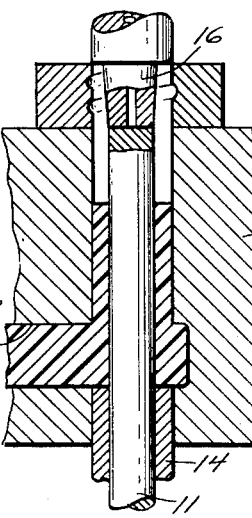
Figure 3:
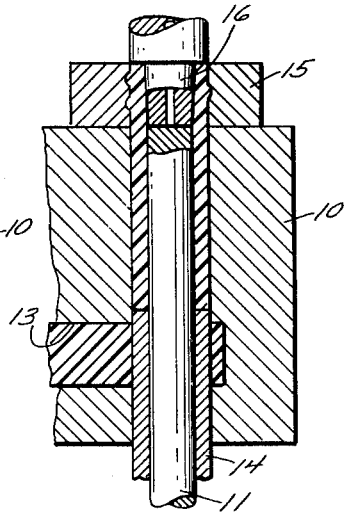
Figure 4:
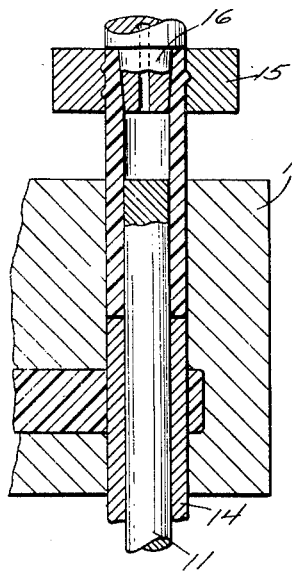
Figure 5:
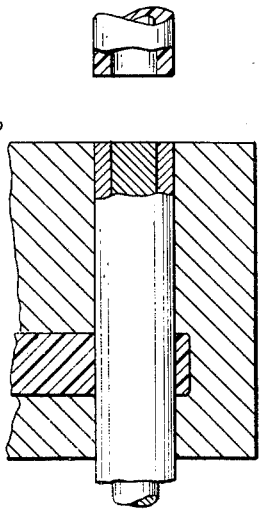
Figure 6:
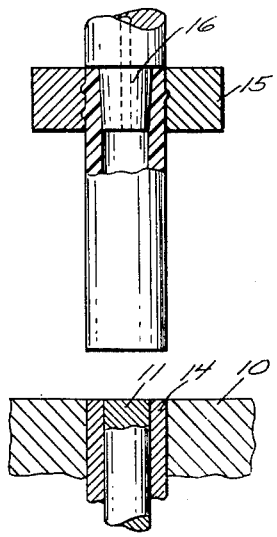

At the beginning of the cycle the sleeve 14 is in its lowermost position (Fig. 1) and plastic material supplied by the extruder is allowed to enter through communicating channel 13 to a predetermined height in the tubular cavity, as shown in Fig. 2. The sleeve 14 is then moved upwardly, thereby severing a quantity of plastic in the tubular cavity from the parent mass in the communicating channel. Continued movement of the sleeve forces a quantity of plastic material in the tubular cavity upwardly into the neck mold 15 (Fig. 3), which is in contact with the body 10. The neck mold and sleeve are then moved simultaneously upwardly thereby removing the tubular shaped mass of plastic which forms a body blank, with the integral neck, from the cavity.

The body mold 17 (Fig. 7) is then closed about the tubular mass, pinching and sealing the lower end, and fluid is applied through the hollow core 16 to expand the plastic material to the walls of the mold. After the expansion, the mold is opened and the only trimming required to form the finished article is the removal of the small nubbin 20 formed by pinching the end of the tubular mass.

A modification of the method may be performed as shown in Figs. 8 and 9 by sealing the lower end of the tubular mass, for example, by pinching or marvering, prior to closing the mold about the tubular mass. The mold is then closed and the tubular mass expanded by application of fluid under pressure through the neck, resulting in a finished article which requires no trimming. In this modification, the bottom of the mold sections 21 are not spaced apart since it is not necessary to pinch the tube by the closing action of the mold sections.

Figure 10:
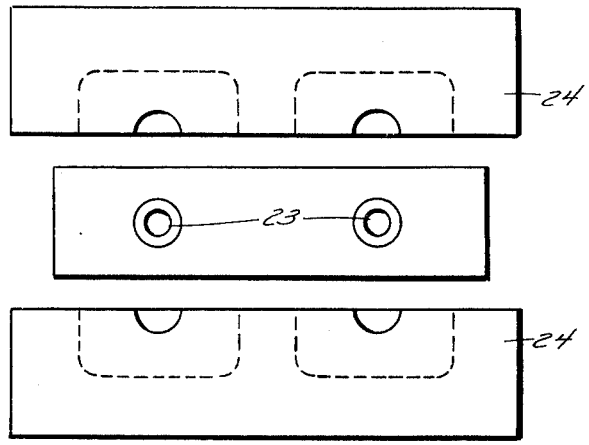
Fig. 10 is a plan view of an apparatus for performing another modification of the method.
Figure 11:
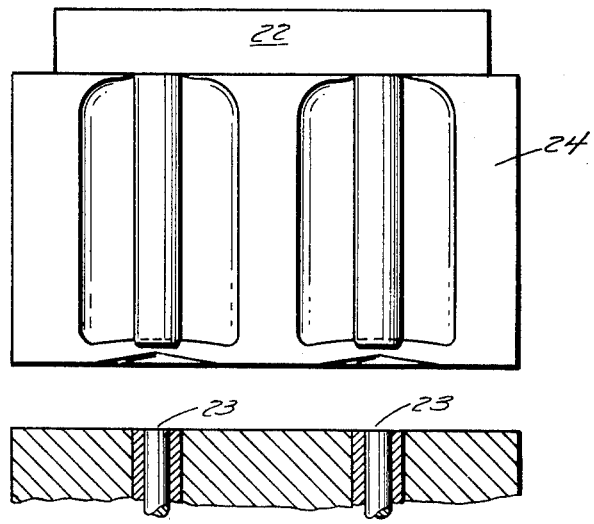
Fig. 11 is a fragmentary part sectional elevational view of the same.

A further modification of the method is shown in Figs. 10 and 11 wherein a multiplicity of tubular masses with integral necks are formed simultaneously and simultaneously removed from their respective cavities by a series of neck molds 22 and cavities 23. The multiplicity of tubular masses may be expanded in a multiple cavity mold 24 by any of the methods heretofore described, namely, pinching the end thereof by closing the sections of a multiple cavity mold or by sealing the ends thereof and then closing the sections of the mold.

The invention has been described as being applied to thermoplastic material. The term "thermoplastic" as used herein defines any organic material which has the required condition of plasticity to permit expansion and setting in predetermined form.

The terms tubular and tubing, as used herein, are intended to include any hollow shapes in which plastic materials may be formed, including non-circular and irregular shapes.

Modifications may be resorted to within the spirit and scope of the appended claims.

I claim:

1. In a method of making a blank of heated plasticized material from which plastic containers can be subsequently blown, said material being normally moved to and through an accumulating cavity having communication (1) with a plasticizing source of supply of said material under pressure and (2) with an annular extrusion orifice, the steps of moving said plasticized material from said source of supply into said cavity under the pressure of the plasticizing source, positioning a neck mold against said orifice and in communication with said cavity, applying a positive displacement pressure from a pressure source other than that of said plasticizing source to the material within said cavity to force a portion only of the material in said cavity through said orifice and into the neck mold positioned thereagainst, and moving said neck mold relative to said orifice while applying pressure to the material in said cavity to express a quantity of said material through said orifice in unconfined tubular form, said tubular form being integrally joined with the material in said neck mold.

2. The method as defined in claim 1, in which the pressure to (1) force material into the neck mold and (2) express the quantity of material through the orifice in tubular form is derived from the same source different from that of said plasticizing source.

References Cited in the file of this patent

UNITED STATES PATENTS

| | | |
|---|---|---|
| 2,080,783 | Petersen | May 18, 1937 |
| 2,262,612 | Kopitke | Nov. 11, 1941 |
| 2,288,454 | Hobson | June 30, 1942 |
| 2,290,129 | Moreland et al. | July 14, 1942 |
| 2,298,716 | Moreland et al. | Oct. 13, 1942 |
| 2,331,687 | Hobson | Oct. 12, 1943 |
| 2,331,702 | Kopitke | Oct. 12, 1943 |
| 2,443,053 | Parmelee | June 8, 1948 |
| 2,562,523 | Brunet | July 31, 1951 |
| 2,597,558 | Bailey | May 20, 1952 |
| 2,657,431 | Slaughter | Nov. 3, 1953 |

FOREIGN PATENTS

| | | |
|---|---|---|
| 692,590 | Great Britain | June 10, 1953 |